Patented Dec. 24, 1940

2,225,619

UNITED STATES PATENT OFFICE 2,225,619

INSECTICIDAL COMPOSITION

Edgar C. Britton and Frank B. Smith, Midland, Mich., assignors to The Dow Chemical Company, Midland, Mich., a corporation of Michigan No Drawing. Application November 22, 1939, Serial No. 305,707

11 Claims. (Cl. 167—30)

This invention relates to insecticidal materials, and particularly to compositions in which amine salts of 2,4-dinitro-phenols are employed as toxic ingredients.

Many synthetic organic compounds have been suggested as substitutes for lead arsenate- and copper-containing inorganic compounds and for pyrethrum, rotenone, and other natural-occurring insecticidal products. Almost without exception, these synthetic toxicants are injurious to plant foliage so that their use must be carefully controlled. A further disadvantage accruing to many of the synthetic toxicants heretofore employed is their toxicity to humans and incompatibility with other insecticidal materials. Certain of the phenols heretofore suggested have not been entirely satisfactory, due to their solubility in water and high volatility, whereby they are readily leached or vaporized away from plant surfaces. Such compounds frequently produce aqueous solutions which burn foliage or otherwise impair normal plant metabolism.

The dinitro-phenols have been suggested as insecticidal toxicants and when properly compounded are highly efficient for the control of selected agricultural pests. Many of these compounds, however, are sufficiently soluble in water as to form aqueous solutions which have a corrosive action on growing leaves. Furthermore, certain of the more common dinitro-phenols are relatively impermanent in their action, due to their high volatility and tendency to oxidize or otherwise disintegrate upon contact with the air.

We have discovered that the addition salts of the mono- and dicyclohexyl-amines with the 2,4-dinitro-phenols are effective insecticidal toxicants and that compositions comprising the less water-soluble of these products may be applied to growing foliage without causing injury to the extent previously inherent to the use of many of the 2,4-dinitro-phenols. The compounds with which the present invention is broadly concerned are the cyclohexyl-amine addition salts of those phenols characterized by nuclear-substituted nitro groups in the para- position and in one of the positions ortho- to the hydroxyl radical, and in which the cyclohexyl-ammonium radical has the following formula

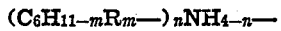

wherein $m$ and $n$ are integers not greater than 2 and R represents a hydrogen, halogen, aryl, aralkyl, cycloalkyl, or an alkyl radical containing from 1 to 8 carbon atoms, inclusive. These compounds are high-melting crystalline solids, difficultly soluble in both water and common organic solvents, stable to light and air, and not appreciably affected by carbon dioxide.

A preferred group of compounds, falling within the scope of the invention, are those cyclohexyl-amine salts derived from 2,4-dinitro-phenols having the formula

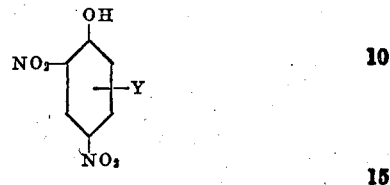

wherein Y represents a benzo, aryl, or cycloalkyl substituent, or a lower alkyl radical containing at least 2 carbon atoms. These compounds are particularly valuable as constituents of insecticidal compositions for use as summer sprays or dusts, which are to be contacted with growing vegetation. It has been found for those members of the preferred group that the water solubility is consistently below 0.05 gram per 100 grams of water at 25° C. This reduced solubility, coupled with the high melting point, stability and low vapor pressure, results in an extended residual toxicity against insect pests, and reduced foliage injury for compositions comprising such compounds. A further advantage in the use of these salts lies in the fact that their low water solubility and stability permits their use in combination with common organic and inorganic insecticidal toxicants which heretofore have been considered incompatible with phenolic compounds.

The compounds as described in the foregoing paragraph may be prepared by reacting a suitable amine compound, such as cyclohexyl-amine, methyl - cyclohexyl - amine, dicyclohexyl-amine, chlorocyclohexyl - amine, phenyl - cyclohexyl - amine, and the like, with a solution of a 2,4-dinitro-phenol in benzene, chlorobenzene, or alcohol. The amounts of reactants and the temperature of reaction are not critical, although equimolecular proportions of the amine and phenol and a temperature of between about 40° and 120° C. are preferably employed. The amine salt of the phenol precipitates during the reaction of the amine with the phenol and is conveniently separated by filtration from the reaction mixture. The preparation and properties of a large number of these amine salts are described in application Serial No. 305,706, filed concurrently herewith, and claiming these materials as new compounds. The physical characteristics of certain representative members of this class of compounds are set forth in the following table.

amine salts may be employed in combination with oil emulsions. They may also be employed in water suspension with or without an additional

*Table*

| Compound | Melting point | Color | Solubility in grams per 100 grams of water at 25° C. | pH of saturated solution |
|---|---|---|---|---|
| | °C. | | | |
| Mono-cyclohexyl-amine salt of 2,4-dinitro-6-cyclohexyl-phenol | 218–9 | Orange-yellow | 0.0222 | 7.09 |
| Dicyclohexyl-amine salt of 2,4-dinitro-6-cyclohexyl phenol | 197–8 | Orange | 0.0028 | 7.08 |
| Mono-(2-methyl-cyclohexyl)-amine salt of 2,4-dinitro-6-cyclohexyl phenol | 201 | Orange-yellow | 0.0084 | 6.8 |
| Di-(2-methyl-cyclohexyl)-amine salt of 2,4-dinitro-6-cyclohexyl phenol | 193–4 | Light orange | 0.0049 | 7.05 |
| Dicyclohexyl-amine salt of 2,4-dinitro-6-ethyl phenol | 179–80 | Orange | 0.0458 | 8.70 |
| Dicyclohexyl-amine salt of 2,4-dinitro-6-n-hexyl phenol | 150–2 | do | 0.0042 | 7.59 |
| Dicyclohexyl-amine salt of 2,4-dinitro-6-phenyl phenol | 167–8 | do | 0.0152 | 8.57 |
| Dicyclohexyl amine salt of 2,4-dinitro-alpha naphthol | 204–5 | Yellow | 0.0102 | 8.54 |
| Dicyclohexyl-amine salt of 2,4-dinitro-phenol | 163–4 | do | 0.20 | 8.79 |
| Dicyclohexyl-amine salt of 2,4-dinitro-6-methyl phenol | 166–7 | do | 0.164 | 7.90 |
| Dicyclohexyl-amine salt of 2,4-dinitro-6-chloro-phenol | 135–6 | Orange | 0.134 | 8.42 |

Other cyclohexyl-amine salts of dinitro-phenols which may be employed as insecticidal and microbicidal toxicants as herein described include the addition compounds obtained by reacting such amines as mono- and di-(3-bromo-cyclohexyl)-amines, mono- and di-(3,5-dimethyl-cyclohexyl)-amines, mono- and di-(3-methyl-cyclohexyl)-amines, mono- and di-(4-methyl-cyclohexyl)-amines, mono- and di-(3-phenyl-cyclohexyl)-amines, mono- and di-(2-benzyl-cyclohexyl)-amines, mono- and di-(2-ethyl-cyclohexyl)-amines, mono- and di-(2,6-dimethyl-cyclohexyl)-amines, mono- and di-(4-phenyl-cyclohexyl)-amines, and the like with 2,4-dinitro-6-cyclohexyl phenol, 2,4-dinitro-6-methyl phenol, 2,4-dinitro-6-ethyl phenol, 2,4-dinitro-6-n-hexyl phenol, 2,4-dinitro-6-phenyl phenol, 2,4-dinitro-alpha naphthol, 2,4-dinitro-5-anilino-phenol, 2,4-dinitro-5-naphthylamino-phenol, 2,4-dinitro-5-cyclohexyl phenol, 2,4-dinitro-6-cyclopentyl phenol, 2,4-dinitro-6-tertiary-octyl phenol, 2,4-dinitro-carvacrol, and 2,4-dinitro-6-bromo-phenol.

The compounds as set forth above are employed as constituents of either dust or spray compositions. They may be compounded with various inert carriers, such as diatomaceous earth, bentonite, talc, sulphur, wood flours, inorganic phosphates, or lime, to form agricultural dusts adapted to be applied with standard dusting equipment. If desired, such dusts may be employed as concentrates and subsequently diluted with additional inert carrier or suspended in water or other liquid carrier to form sprays. The amine addition salts may also be incorporated with various wetting, dispersing, and sticking agents and subsequently diluted to produce dust or spray compositions in which the amine salt is present in any desired concentration. In the preparation of concentrates, from about 5 to about 80 per cent of the amine salt is commonly employed. The concentration of the amine salt in spray or dust compositions on application to living vegetation is preferably between about 0.01 per cent and 5.0 per cent by weight. The particular adaptation in which the amine salt is employed and the concentration thereof in the final composition are dependent upon the type of insect to be controlled and the circumstances under which such control is to be accomplished.

In other embodiments of the invention, the emulsifying, wetting or dispersing agent. In a further modification where it is desired to impregnate solid carriers with the amine salt, the carrier may be introduced into the salt reaction mixture and the amine salt precipitated directly in and on the carrier surfaces. The amine salts may similarly be incorporated in other standard type insecticidal compositions, either as the sole toxic ingredient of such composition or in combination with such materials as inorganic pigments, organic dyes, lead arsenate, pyrethrum, rotenone, organic thiocyanates, sulphur, copper sprays, and related compounds.

The several examples are illustrative with respect to the particular compounds, composition types, and concentrations employed, but are not to be construed as limiting the invention.

EXAMPLE 1

The following mixtures were compounded and tested to determine their insecticidal efficiency against the larvae of Colorado potato beetle:

*Composition 1*

Parts by weight
Dicyclohexyl-amine salt of 2,4-dinitro-6-cyclohexyl phenol _____ 20
Diatomaceous earth _____ 80

*Composition 2*

Monocyclohexyl-amine salt of 2,4-dinitro-6-cyclohexyl phenol _____ 20
Diatomaceous earth _____ 80

*Composition 3*

Dicyclohexyl-amine salt of 2,4-dinitro-phenol 20
Diatomaceous earth _____ 80

*Composition 4*

Dicyclohexyl-amine salt of 2,4-dinitro-6-phenyl phenol _____ 20
Diatomaceous earth _____ 80

These compositions were prepared by grinding the indicated proportions of materials in a ball mill to form homogeneous mixtures in which the amine salts had an average particle size of 1–5 microns diameter. Each such composition was then dispersed in water and sprayed on potato vines heavily infested with the beetle larvae.

Compositions 1 and 2 were found to be 100 per cent effective in 2 days at an amine salt concentration of 0.4 pound per 100 gallons of spray material. Compositions 3 and 4 at amine salt concentrations of 3.0 pounds per 100 gallons killed 80 and 98 per cent of the larvae, respectively, in 3 days. Control experiments with acid lead arsenate at a concentration of 3.0 pounds per 100 gallons killed an average of 86 per cent of the potato beetle larvae in 3 days. These sprays were also applied to young soybean foliage in injury determinations. Compositions 1 and 2 caused no injury. Compositions 3 and 4 and the lead arsenate, at the concentrations employed, caused a yellowing around the edges of certain of the leaves contacted therewith.

EXAMPLE 2

89 parts by weight of the dicyclohexyl-amine salt of 2,4-dinitro-6-cyclohexyl phenol, 10 parts by weight of red talc, and 1 part by weight of the sodium salt of a sulphonated phenol were mixed together and ground in a ball mill to an average particle size of less than 5 microns diameter. 0.562 pound of this composition was dispersed in 100 gallons of water to form a spray material comprising 0.5 pound of the active toxicant. This spray was applied to apple foliage infested with tent caterpillar larvae of the 4th instar and killed 95 per cent of the larvae in 3 days. Approximately 2 per cent of the sprayed leaves showed a slight fading due to the treatment. In a comparative determination, acid lead arsenate at a concentration of 3.0 pounds per 100 gallons was applied for control of the same insect and found to kill 95 per cent of the tent caterpillar larvae. The lead arsenate caused appreciably more injury to the leaves than did the composition containing the amine salt.

EXAMPLE 3

1.5 pounds of Composition 2 (described in Example 1) was dispersed in 100 gallons of water to obtain a spray composition comprising 0.3 pound per 100 gallons of the monocyclohexyl-amine salt of 2,4-dinitro-6-cyclohexyl phenol. This composition was applied to apple foliage infested with 5th instar walnut worms and found to be 70 per cent effective. A concentration of 3.0 pounds per 100 gallons of lead arsenate gave a control of 100 per cent. In this application no injury was observed for either the lead arsenate or the composition comprising the amine salt.

EXAMPLE 4

Dusting compositions comprising the amine salts as toxic ingredients are illustrated by the following:

*Composition 5*

| | Parts by weight |
|---|---|
| Dicyclohexyl-amine salt of 2,4-dinitro-6-cyclohexyl phenol | 1 |
| Sulphur | 99 |

*Composition 6*

| | |
|---|---|
| Di-(2-methyl-cyclohexyl)-amine salt of 2,4-dinitro-6-cyclohexyl phenol | 2 |
| Walnut shell flour | 98 |

*Composition 7*

| | |
|---|---|
| Dicyclohexyl-amine salt of 2,4-dinitro-alpha naphthol | 1.5 |
| Diatomaceous earth | 98.5 |

The above and related compositions may be applied with standard dusting equipment for the control of codling moth and other chewing insects.

EXAMPLE 5

A concentrate useful for the preparation of combined insecticidal and fungicidal sprays is as follows:

*Composition 8*

| | Parts by weight |
|---|---|
| Dicyclohexyl-amine salt of 2,4-dinitro-6-methyl phenol (particles 1-5 microns in diameter) | 80 |
| Sodium salt of sulphonated lauryl alcohol | 20 |

The above mixture may be suspended in water in amounts of from 0.25 pound to 5.0 pounds per 100 gallons to form aqueous dispersions suitable for application to the trunks and branches of trees during the dormant period, and preferably shortly after leaf fall. Such aqueous compositions are also of value for spraying the ground adjacent to trees and shrubs. When applied in this manner, the amine salt of the dinitro-methyl phenol serves as an active toxicant not only against insect pests, but also aids in the control of various spore-forming fungi.

EXAMPLE 6

A further application to which the cyclohexyl-amine salts of the 2,4-dinitro-phenols may be directed consists of their incorporation in various leather-treating compositions. For example, a fungicidal pickling solution may be prepared as follows:

*Composition 9*

| | Pounds |
|---|---|
| Water | 100 |
| Sodium chloride | 12 |
| Sulphuric acid | 1.5 |
| Dicyclohexyl-amine salt of 2,4-dinitro-6-chloro-phenol | 0.01 |

When skins and hides are immersed and soaked in this composition, the development of undesirable fungi and bacteria, both on the leather and in the treating solution, is substantially inhibited.

The cyclohexyl-amine salts of the dinitrophenols, as described above, are relatively non-toxic to humans as compared to most inorganic insecticides containing lead, arsenic, mercury, cyanide, etc., at present used for pest control. They are substantially non-explosive and difficultly flammable. Numerous instances in which they have been contacted with the skin of humans indicate that they are non-corrosive and not inclined to produce dermatitis even on repeated application.

Other modes of applying the principle of our invention may be employed instead of those explained, change being made as regards the materials or their amounts employed, provided the ingredients stated by any of the following claims or their equivalent be employed.

We therefore particularly point out and distinctly claim as our invention:

1. An insecticidal and fungicidal composition comprising as a toxic ingredient a cyclohexyl-amine salt having the formula

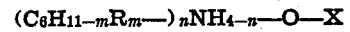

wherein $m$ and $n$ are integers not greater than 2, R represents a member of the group consisting of hydrogen, halogen, aryl, aralkyl, cycloalkyl, and those alkyl radicals containing from 1 to 8 carbon atoms, inclusive, and —O—X represents a substituted phenoxy radical derived from a phenol characterized by nuclear-substituted nitro groups in the para- position and in one of the positions ortho- to the hydroxyl radical.

2. An insecticidal and fungicidal composition comprising a mixture of diatomaceous earth and a cyclohexyl-amine salt having the formula

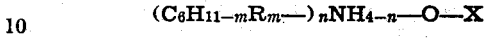

wherein $m$ and $n$ are integers not greater than 2, R represents a member of the group consisting of hydrogen, halogen, aryl, aralkyl, cycloalkyl, and those alkyl radicals containing from 1 to 8 carbon atoms, inclusive, and —O—X represents a substituted phenoxy radical derived from a phenol characterized by nuclear-substituted nitro groups in the para- position and in one of the positions ortho- to the hydroxyl radical.

3. An insecticidal and fungicidal spray comprising an aqueous dispersion of finely divided cyclohexyl-amine salts having the formula

wherein $m$ and $n$ are integers not greater than 2, R represents a member of the group consisting of hydrogen, halogen, aryl, aralkyl, cycloalkyl, and those alkyl radicals containing from 1 to 8 carbon atoms, inclusive, and —O—K represents a substituted phenoxy radical derived from a phenol characterized by nuclear-substituted nitro groups in the para- position and in one of the positions ortho- to the hydroxyl radical.

4. An insecticidal dust comprising a cyclohexyl-amine salt having the formula

wherein $m$ and $n$ are integers not greater than 2, R represents a member of the group consisting of hydrogen, halogen, aryl, aralkyl, cycloalkyl, and those alkyl radicals containing from 1 to 8 carbon atoms, inclusive, and —O—X represents a substituted phenoxy radical derived from a phenol characterized by nuclear-substituted nitro groups in the para- position and in one of the positions ortho- to the hydroxy radical, which cyclohexyl-amine salt is dispersed in and through a finely divided solid carrier.

5. An insecticidal and fungicidal composition comprising as a toxic ingredient a cyclohexyl-amine salt having the formula

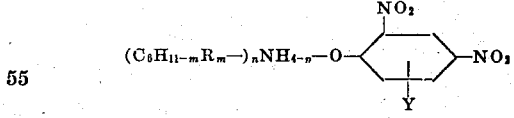

wherein $m$ and $n$ are integers not greater than 2, R represents a member of the group consisting of hydrogen, halogen, aryl, aralkyl, cycloalkyl, and those alkyl radicals containing from 1 to 8 carbon atoms, inclusive, and Y represents a member of the group consisting of benzo, aryl, cycloalkyl, and lower alkyl radicals containing at least 2 carbon atoms.

6. An insecticidal and fungicidal composition comprising as a toxic ingredient a cyclohexyl-amine salt having the formula

wherein $n$ is an integer not greater than 2, and —O—X represents a substituted phenoxy radical derived from a phenol characterized by nuclear-substituted nitro groups in the para- position and in one of the positions ortho- to the hydroxyl radical.

7. An insecticidal and fungicidal composition comprising as a toxic ingredient a cyclohexyl-amine salt having the formula

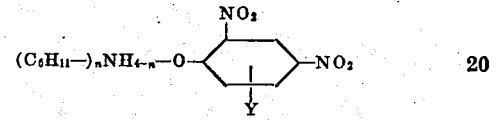

wherein $n$ is an integer not greater than 2, and Y represents a member of the group consisting of benzo, aryl, cycloalkyl, and lower alkyl radicals containing at least 2 carbon atoms.

8. An insecticidal and fungicidal composition comprising as a toxic ingredient a dicyclohexyl-amine salt having the formula

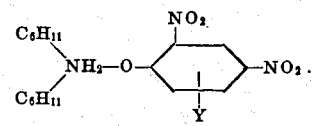

wherein Y represents a member of the group consisting of benzo, aryl, cycloalkyl, and lower alkyl radicals containing at least 2 carbon atoms.

9. An insecticidal and fungicidal composition comprising as a toxic ingredient a monocyclohexyl-amine salt having the formula

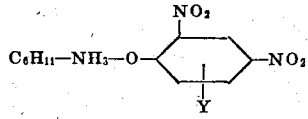

wherein Y represents a member of the group consisting of benzo, aryl, cycloalkyl, and lower alkyl radicals containing at least 2 carbon atoms.

10. An insecticidal and fungicidal composition comprising as a toxic ingredient the dicyclohexyl-amine salt of 2,4-dinitro-6-cyclohexyl phenol.

11. An insecticidal and fungicidal composition comprising as a toxic ingredient the monocyclohexyl-amine salt of 2,4-dinitro-6-cyclohexyl phenol.

EDGAR C. BRITTON.
FRANK B. SMITH.